Nov. 17, 1931.   R. F. SCHNEIDER   1,832,139
CLINICAL THERMOMETER
Filed April 24, 1930
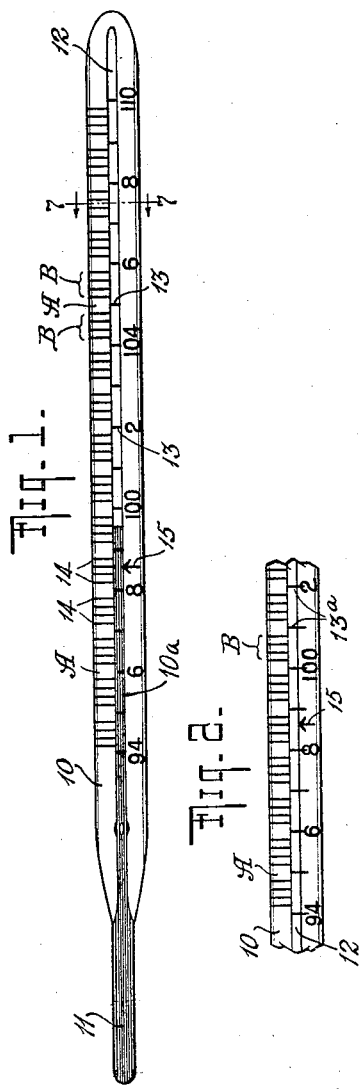
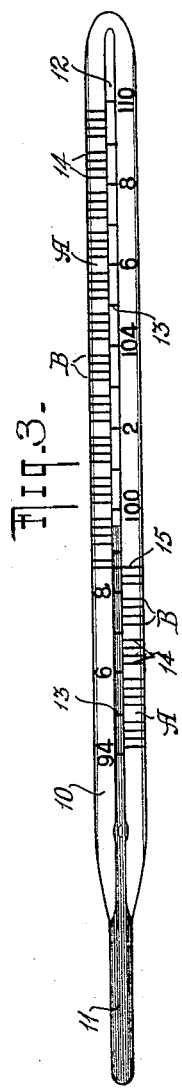
WITNESS
INVENTOR
RALPH F. SCHNEIDER
BY
ATTORNEYS Patented Nov. 17, 1931

1,832,139

UNITED STATES PATENT OFFICE

RALPH F. SCHNEIDER, OF JERSEY CITY, NEW JERSEY, ASSIGNOR TO MEINECKE & COMPANY, OF NEW YORK, N. Y., A CORPORATION OF NEW JERSEY

CLINICAL THERMOMETER

Application filed April 24, 1930. Serial No. 446,806.

My invention relates to clinical thermometers of the type known as lens front or magnifying front. The tube of thermometers of this type has its cross-sections in the form approximating that of an isosceles triangle, the edges, however, being slightly rounded, one of such rounded edges constituting a lens through which the mercury column may be observed in magnified proportions and is customarily read by holding the thermometer in a horizontal position with the bulb to the left.

It is the object of my invention to enable a thermometer of this type to be more easily and accurately read by the user, particularly in a dimly lighted sickroom.

My invention contemplates a new arrangement of the graduation marks, which arrangement is characterized by the fact that a completely blank space is provided between each adjacent pair of groups of graduation marks which indicate fractions of a degree, and this I accomplish by arranging the full degree marks in such a manner either that they do not extend so far between such groups as not to leave between such groups a substantially large free area by which such groups are clearly segregated, or, preferably, that such marks do not extend at all between such groups.

My invention is illustrated by way of example but not by way of limitation in the accompanying drawings in which Fig. 1 is a front elevation of a thermometer embodying one form of my invention; Fig. 2 is a fragmentary front elevation of a thermometer indicating a modification of my invention; and Fig. 3 is a front elevation of a thermometer showing the modification illustrated in Fig. 1 but in the arrangement shown in my United States Letters Patent No. 994,482, dated June 6, 1911.

In Fig. 1, 10 represents a thermometer tube of the lens front type having a lens or magnifying front 10a and provided with the usual bulb 11 and mercury channel 12. The graduation marks forming the usual thermometer scale comprise marks 13—13 indicating full degrees, and marks 14—14 indicating fractions of a degree, the mark 15 indicating the normal temperature of 98.6°, and the usual Arabic numerals indicating cardinals of alternate full degree marks. Each of the lines constituting the full degree marks 13—13 extends from a point coinciding with the upper edge of the channel 12 to a point on the line defining the lower edge of such channel. When speaking of the channel 12 or of the "edges" of such channel, or of the relation of the graduation marks thereto, I refer to the channel or the edges, as the case may be, as they are visible to the reader's eye, through the magnifying front 10a, and to the graduation marks as visible to the reader's eye with relation to such channel as thus seen. Each of the lines 14—14 constituting the marks indicating the fractions of a degree extends from a point well above the mercury channel 12 to a point where such line meets the upper edge of such channel. This arrangement of the marks leaves a completely blank space A between adjacent groups B—B of fractional degree marks, the blank space being approximately equal to twice the distance between the fractional degree marks of a group.

In the modification shown in Fig. 2 the scale is like that shown in Fig. 1 except that the full degree marks 13a do not terminate at the lower edge of the mercury channel but extend beyond the same.

In the modification shown in Fig. 3 the scale is like that shown in Fig. 1 but in order to distinguish more readily the graduations indicating sub-normal temperature from those indicating fever temperature, the scale above 98.6° is arranged above the mercury channel; thus the marks indicating sub-normal temperature are arranged below such channel. I make no claim to the arrangement of sub-normal temperature marks on one side of the mercury channel and fever temperature marks on the other side of the mercury channel as this is shown in my United States Letters Patent No. 994,482, dated June 6, 1911.

The blank spaces A not only indicate in and by themselves the full degree position but, by separating the groups of fractional degree marks, make it very easy to determine to how many fractions of a degree the upper end of the mercury column extends. The fraction of a degree can be read without any reference at all to the full degree mark, and after the fraction has been read the eye can travel to the first full degree mark below the top of the mercury column and thus complete the reading. With the markings of the prior art such, for instance, as illustrated in my Letters Patent referred to, the eye of the reader becomes confused and the fraction must be read by deliberately counting the fractional marks from the full degree mark instead of reading the fraction at a glance.

The scales on clinical thermometers are so arranged that ten full degrees, or fifty graduation marks, occupy from one inch to one and three-quarters inches. Thermometers in which ten full degrees occupy only one inch or one and one-quarter inches necessarily have the fractional marks very close together and are therefore difficult to read, especially in a dimly lighted sickroom. The provision of the blank spaces A is of particular advantage in reading such closely graduated scales.

The form of my invention shown in Fig. 1, possesses the additional advantage of having the inner ends of the full degree and fractional degree marks coincide, some with one of the edges and others with the other edge of the mercury channel, and thus constitute a finder for the mercury column. This inventive thought is not claimed in the present invention but forms the subject-matter of another application Serial Number 453,904, filed May 20, 1930.

I claim:

As an article of manufacture a clinical thermometer of the lens front type provided with marks indicating full degrees, said marks extending from one edge of the magnified mercury channel across said channel and with groups, each of which is formed of a plurality of marks indicating a fraction of the same degree and extending to the edge of the mercury channel at which said full degree marks begin, a portion at least of each of such groups being separated from the corresponding portion of the group adjacent thereto on the same side of the mercury channel by a completely unmarked space equal to approximately twice the distance between the fractional degree marks of a group.

RALPH F. SCHNEIDER.